(12) United States Patent
Hsieh

(10) Patent No.: US 6,526,634 B1
(45) Date of Patent: Mar. 4, 2003

(54) FASTENER FOR A HEAT SINK ON A CHIP

(76) Inventor: Hsin-Mao Hsieh, No. 6, East Section, Chiao Nan Li, Industrial 6th Rd., Pingtung City, Pingtung Hsien (TW)

( * ) Notice: Subject to any disclaimer, the term of this patent is extended or adjusted under 35 U.S.C. 154(b) by 0 days.

(21) Appl. No.: 09/987,473

(22) Filed: Nov. 14, 2001

(51) Int. Cl.[7] .............................................. F16B 13/00
(52) U.S. Cl. ............................ 24/458; 24/453; 24/457; 411/508; 257/718; 361/704; 174/16.3
(58) Field of Search ......................... 24/457, 458, 459, 24/462, 546, 453, 572, 297, 628; 411/508–510, 913; 361/704; 257/718; 174/163

(56) References Cited

U.S. PATENT DOCUMENTS

| | | | | |
|---|---|---|---|---|
| 2,515,827 A | * | 7/1950 | Howard | 52/714 |
| 2,769,363 A | * | 11/1956 | Kight | 411/343 |
| 6,105,215 A | * | 8/2000 | Lee | 24/458 |
| 6,112,378 A | * | 9/2000 | Lee | 24/458 |
| 6,301,113 B1 | * | 10/2001 | Guerrero | 361/704 |
| 6,334,750 B1 | * | 1/2002 | Hsieh | 411/508 |
| 6,431,585 B1 | * | 8/2002 | Rickabus et al. | 280/728.3 |

* cited by examiner

Primary Examiner—J. J. Swann
Assistant Examiner—André L. Jackson
(74) Attorney, Agent, or Firm—Fei-Fei Chao; Venable, Baetjer, Howard & Civiletti, LLP

(57) ABSTRACT

A fastener has a leg, a foot, an elastic portion and a flange formed on the leg, wherein the elastic portion has a ring around the leg and two bow arms oppositely connects two sides of the ring with two sides of the leg. The flange is higher than the ring of the elastic on the leg, so that the movement of the bow arms is limited by the flange. Therefore the fastener ensures the bow arms has elasticity after installation into the heat sink.

5 Claims, 7 Drawing Sheets

FASTENER FOR A HEAT SINK ON A CHIP

BACKGROUND OF THE INVENTION

1. Field of the Invention

The present invention is related to a fastener, and more particularly to a fastener used for securing a heat sink on a chip of a computer.

2. Description of Related Art

A kind of fastener for a heat sink usually comprises a leg, a foot, a head, a ring and two flexible bow arms. Each of the flexible bow arms has two ends, one end connects to the leg and the other end is free. When the fastener connects the heat sink with the chip, the two flexible bow arms offer a force that makes the heat sink secure to a chip. However the fastener is plastic which tends to lose its elasticity after a certain time whereby compressive force of the bow arms subsides, and thus the heat sink is no longer securely fastened to the chip such that the heat sink is not fully effective.

The low cost of plastic used and simple processes involved mean that the quantity of output of this popular fastener is high. However the fasteners still have the drawback that they may cause the heat sink to be installed on the chip unsteadily.

Therefore, it is an objective of the invention to provide an improved fastener to mitigate and/or obviate the aforementioned problems.

SUMMARY OF THE INVENTION

The main objective of the present invention is to provide a fastener which is able to prevent deterioration of the elastic deformation offering a force, whereby a heat sink is securely attached an operating chip on a main board.

Other objects, advantages and novel features of the invention will become more apparent from the following detailed description when taken in conjunction with the accompanying drawings.

DETAILED DESCRIPTION OF THE PREFERRED EMBODIMENT

Figure 1:
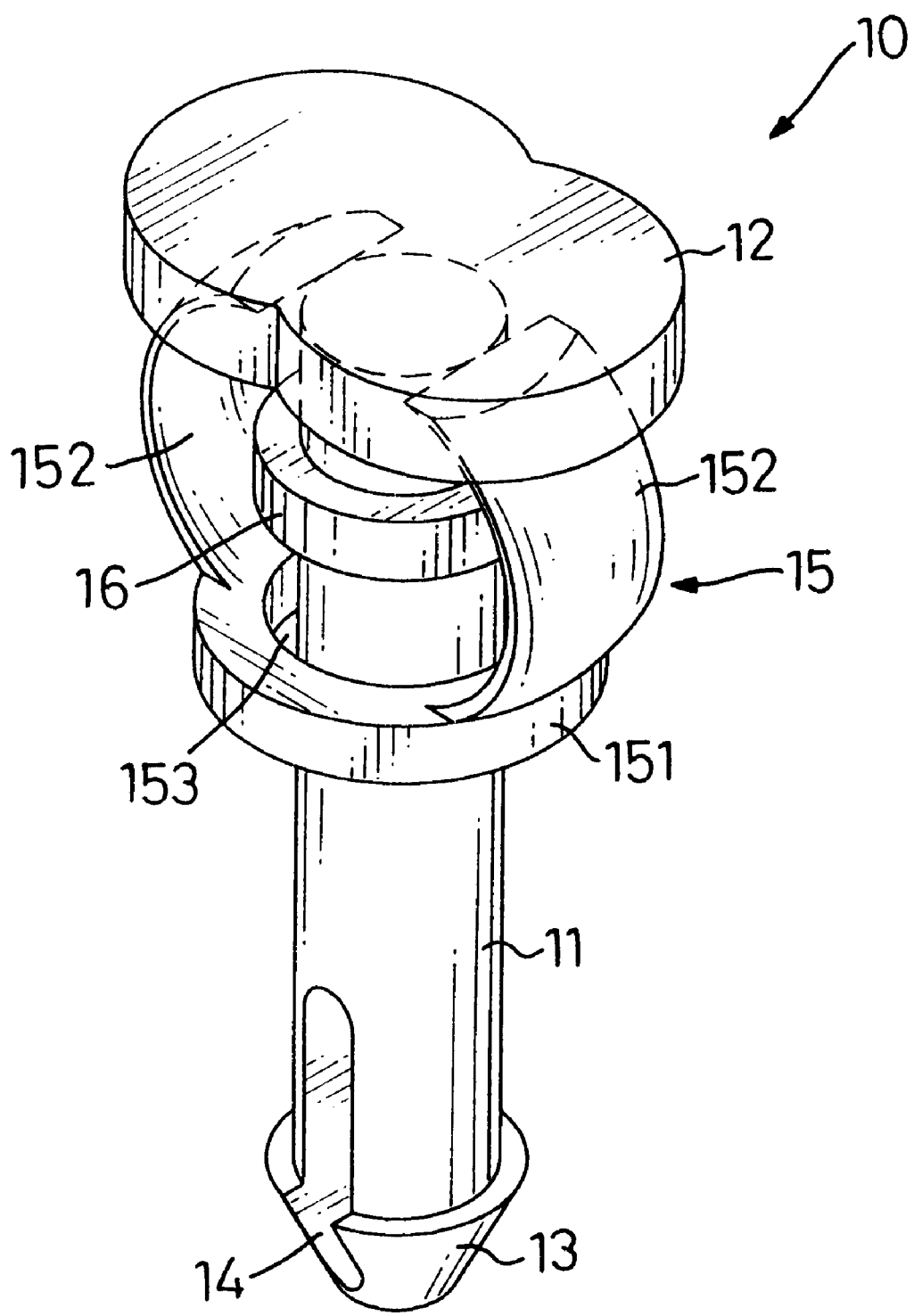
FIG. 1 is a perspective view of a first embodiment of a fastener in accordance with the invention.

Referring to FIG. 1, a fastener(10) in accordance with the present invention comprises a leg (11), a head (12), a foot (13), an elastic portion (15) and a retaining flange (16).

The leg (10) includes an upper end and a lower end. The foot (13) is a cone with a large end adjoining the lower end of the leg (11) and a small distal end. The large and small ends respectively have a diameter larger and smaller than a diameter of the leg (11).

Figure 4:
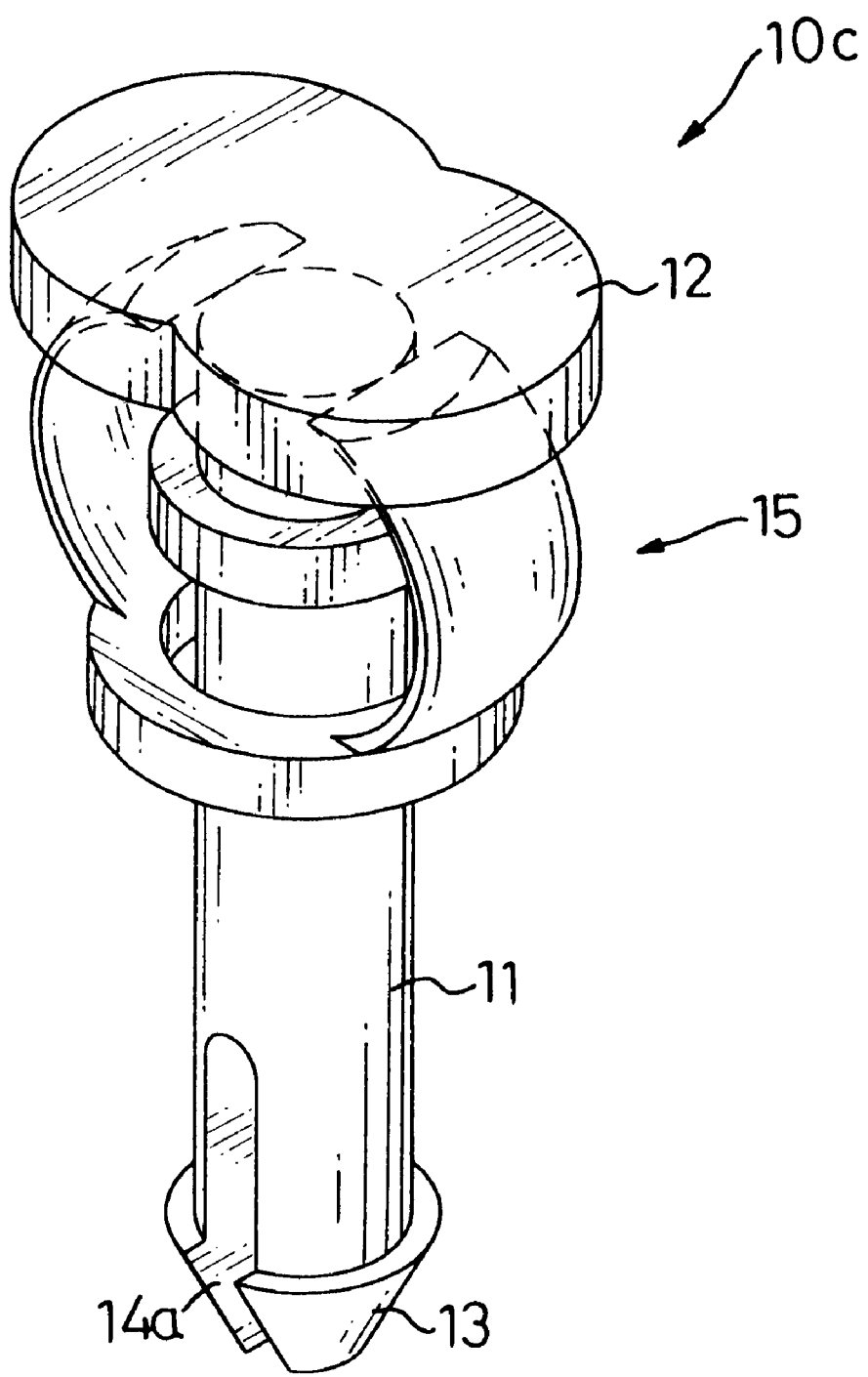
FIG. 4 is a perspective view of a fourth embodiment of the fastener in accordance with the invention.

A channel (14) transversely extends between the lower end of the leg (11) and large end of the foot (13). Although in this embodiment the channel (14) is transverse, it is to be appreciated that other configurations are practical, as shown in FIG. 4, wherein the channel (14a) extends completely to the small distal end and has an open end. The channel (14) gives the foot (13) and the lower end of the leg (10) resiliency whereby they can be deformed to a smaller size than normal. The head (12) is formed on the upper end of the leg (10).

The elastic portion (15) is connection of a ring (151) and two flexible bow arms (152). The ring (151) defines an opening (153) with a diameter larger than the diameter of the leg (11) and can travel substantially between the head (12) and a central point between the upper and lower ends of the leg (11). The two flexible bow arms (152) are oppositely formed on two respective sides of the leg (11) each with a first end fixed on a bottom face of the head (12) and a second end fixed oil a periphery of the ring (151).

The flange (16) forms around an upper portion of the leg (11) and is higher than the ring (151). The diameter of the flange (16) is larger than the diameter of the opening (153).

Figure 2:
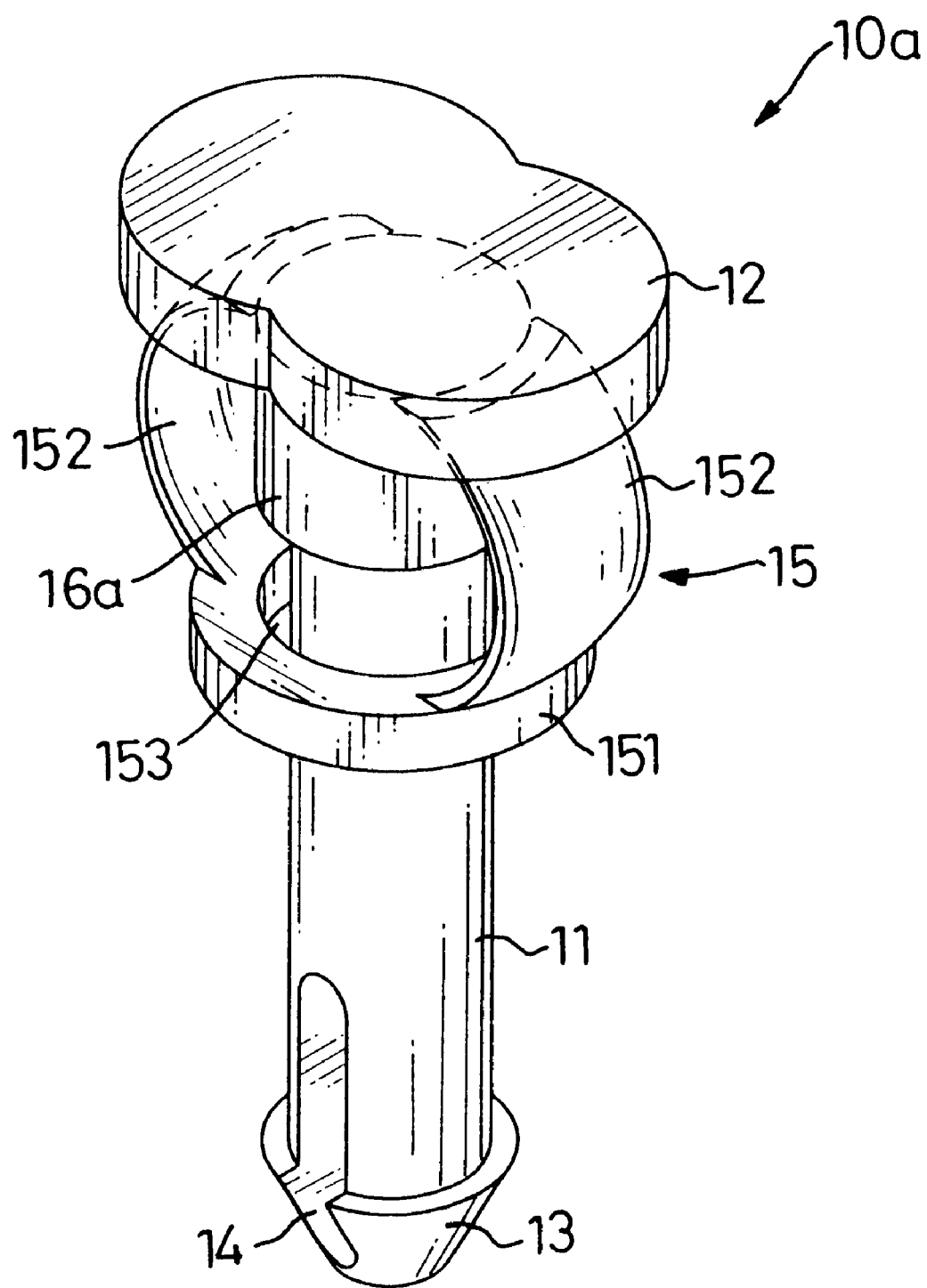
FIG. 2 is a perspective view of a second embodiment of the fastener in accordance with the invention.
Figure 3:
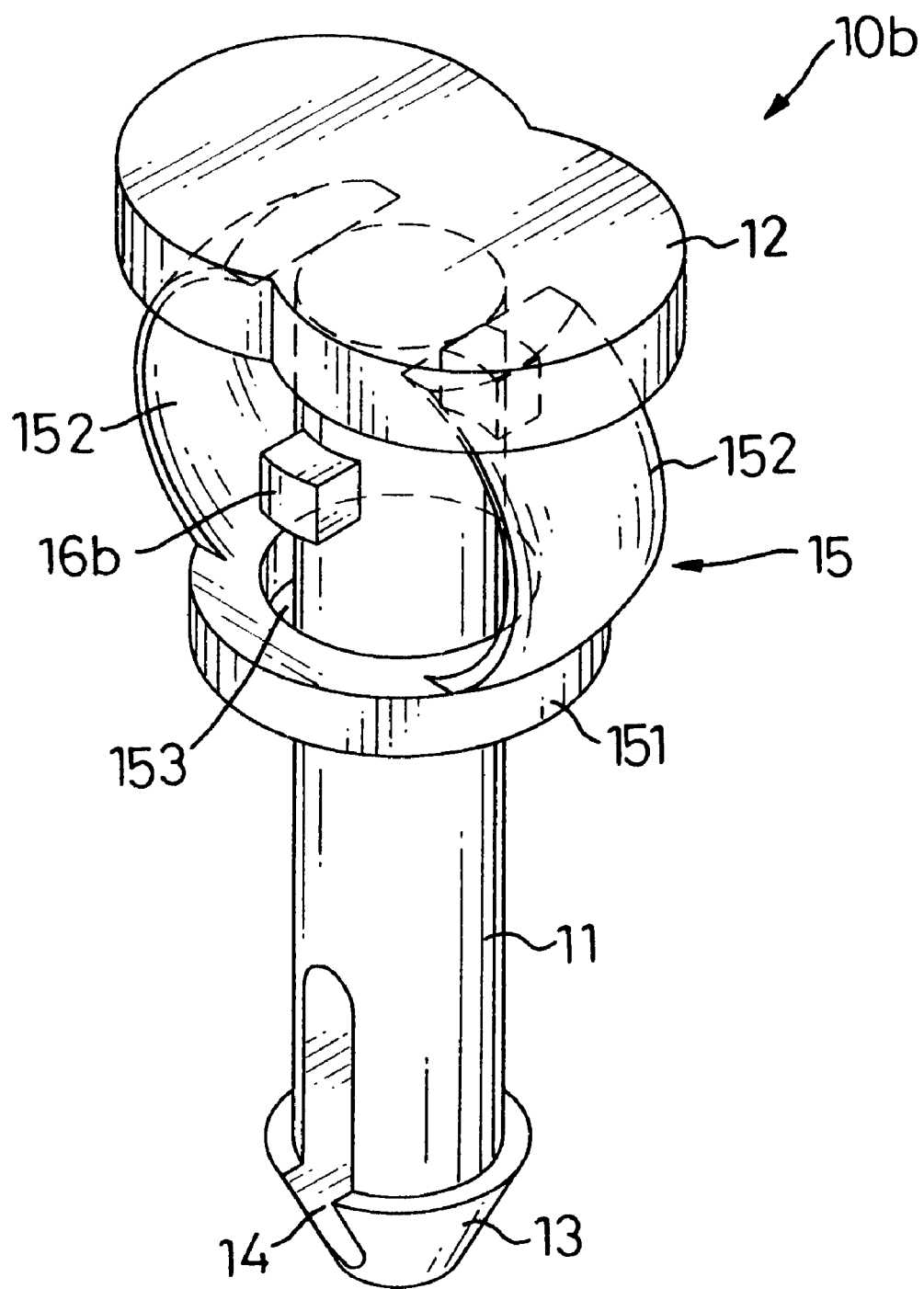
FIG. 3 is a perspective view of a third embodiment of the fastener in accordance with the invention.

Although in the first embodiment the flange (16) is ring-shaped, it is to be appreciated that other configurations are practical, such as a pillar-shape (16a), as shown in FIG. 2, and referring to FIG. 3, two opposed stubs (16b).

Figure 5:
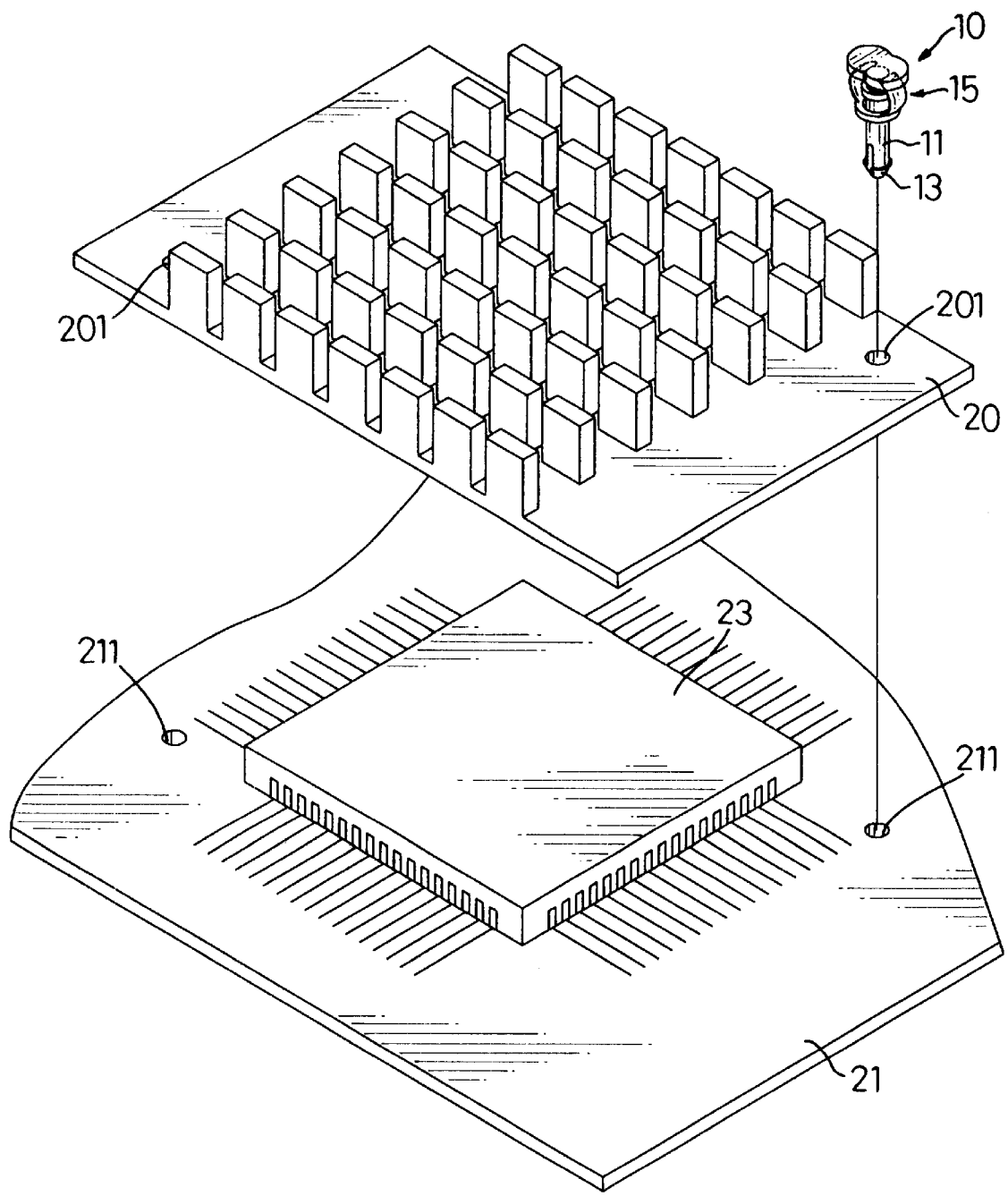
FIG. 5 is an exploded view showing the fastener to fasten a heat sink on a chip.
Figure 6:
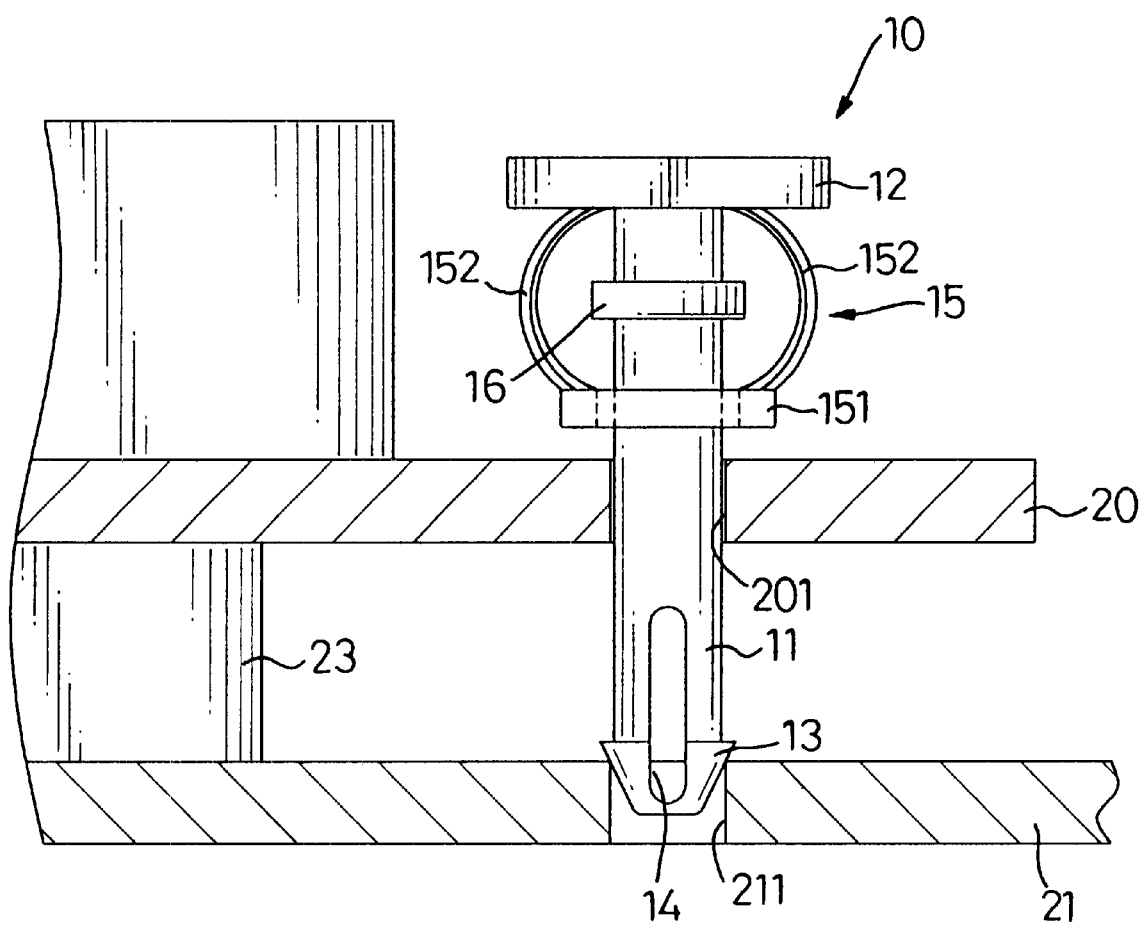
FIG. 6 is a side sectional view showing the fastener being inserted in the heat sink and a main board.

Referring to FIGS. 5 and 6, a heat sink (20) is mounted on a chip (23) installed on a main board (21). The heat sink (20) has first apertures (201) in alignment with second apertures (211) defined in the main board (21). Although in practice each matched pair of first and second apertures (201) (211) receives therethrough a corresponding one of the fasteners (10), reference hereinafter is in the singular. A distance between a top face of the heat sink (20) and a bottom face of the main board (23) is greater than a distance between the bottom face of the ring (151) and the large end of the foot (13).

Figure 7:
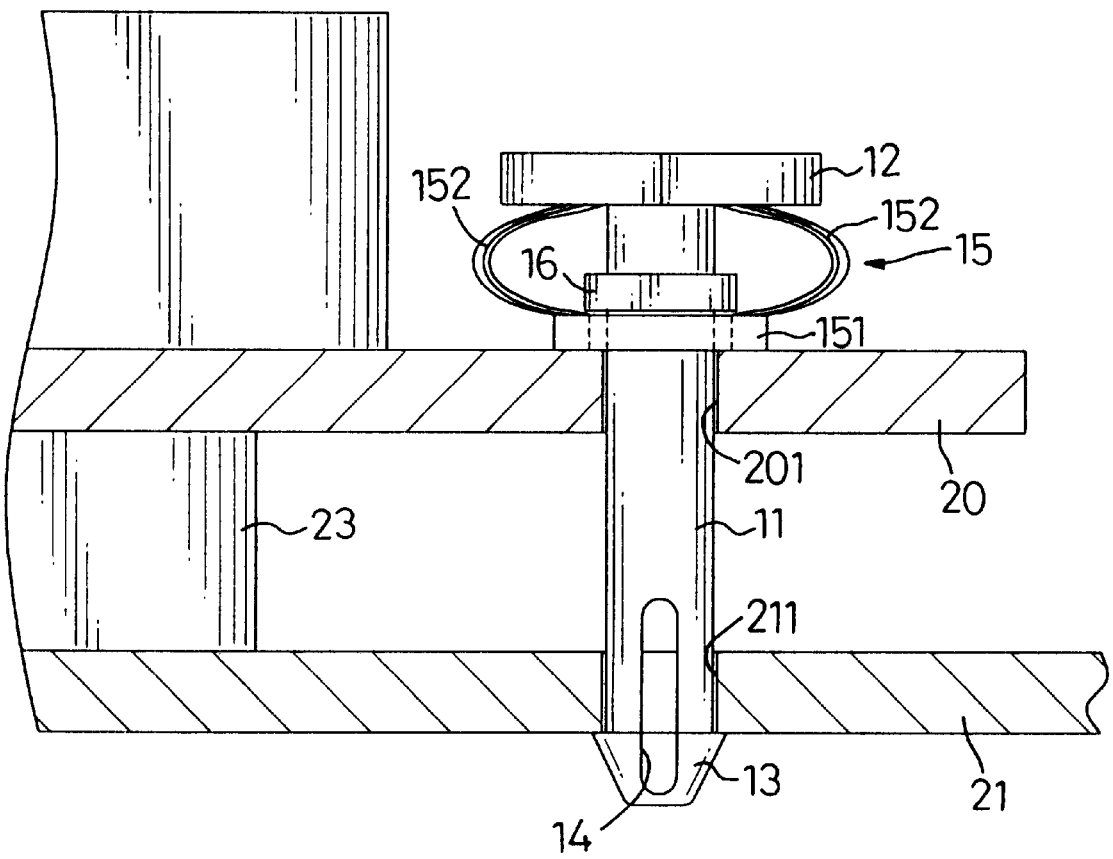
FIG. 7 is a side sectional view showing the fastener having been inserted in the heat sink and a main board.

Referring to FIG. 7, to engage the heat sink (20) with the main board (21) and sandwich the chip (23) therebetween, the foot (13) and the lower end of the leg (10) are compressed to become small enough to pass through the apertures (201) (211), and then they recover to their original sizes whereby the fastener (10) will not be unintentionally released from the apertures (201) (211). At the same time, the ring (151) is pushed by the heat sink (20) towards the flange (16) to compress the bow arms (152) whereby resiliency of the bow arms (152) urges the ring (151) back against the top surface of the heat sink (20), as well as pulling up the foot (13) against the bottom face of the main board (21).

The flange (16) is higher than the ring (151) on the leg (11), so as to limit travel of the ring (151) as it is pushed upwardly by the heat sink (20). Therefore, when the fastener (10) is inserted during installation of the fastener (10) into the heat sink (20), the movement of the bow arms (152) is limited by the flange (16) so as to prevent the excessive movement of the bow arms (152).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastener for a heat sink on a chip, the fastener comprising:

a leg with an outer diameter, a first end and a second end;

a head formed at the second end of the leg;

a cone-shaped foot of which a maximum diameter is larger than an outer diameter of the leg and formed at the first end of the leg and a channel defined in the foot;

an elastic portion formed on an upper portion of the leg, wherein the elastic portion comprises:

two flexible bow arms oppositely formed at two sides of the leg, each bow arm with a first end fixed on a bottom face of the head; and a ring formed on respective second ends of the bow arms and with an opening for allowing the leg to be inserted therethrough;

a flange with a diameter which is larger than a diameter of the opening, the flange being formed on the upper portion of the leg and the flange being at a position higher than a position of the ring.

2. The fastener as claimed in claim 1, wherein the channel extends completely to the small distal end of the cone-shaped foot and has an open end.

3. The fastener as claimed in claim 1, wherein the flange is ring shaped.

4. The fastener as claimed in claim 1, wherein the flange is pillar shaped.

5. The fastener as claimed in claim 1, wherein the flange is two opposed stubs.

* * * * *